United States Patent
Yang et al.

(10) Patent No.: US 9,667,448 B2
(45) Date of Patent: May 30, 2017

(54) METHOD AND APPARATUS FOR CHANNEL ESTIMATION IN WIRELESS COMMUNICATION SYSTEM

(71) Applicant: Samsung Electronics Co., Ltd, Gyeonggi-do (KR)

(72) Inventors: Ha-Young Yang, Yongin-si (KR); Ik-Beom Lee, Seongnam-si (KR); Joo-Hyun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 119 days.

(21) Appl. No.: 14/702,529

(22) Filed: May 1, 2015

(65) Prior Publication Data
US 2015/0319632 A1    Nov. 5, 2015

(30) Foreign Application Priority Data
May 2, 2014    (KR) ......................... 10-2014-0053305

(51) Int. Cl.
*H04W 24/00* (2009.01)
*H04L 25/02* (2006.01)
*H04W 24/08* (2009.01)
*H04L 12/26* (2006.01)

(52) U.S. Cl.
CPC ...... *H04L 25/0204* (2013.01); *H04L 25/0232* (2013.01); *H04L 43/062* (2013.01); *H04W 24/08* (2013.01)

(58) Field of Classification Search
CPC ..... H04W 24/00; H04W 80/04; H04W 88/06; H04B 1/707; H04B 2201/70701; H04B 7/2628; H04L 25/0236; H04L 25/0212; H04L 25/0232; H04L 25/0228
See application file for complete search history.

(56) References Cited

U.S. PATENT DOCUMENTS

| | | | |
|---|---|---|---|
| 8,064,507 B1 | 11/2011 | Cheng et al. | |
| 2003/0030167 A1* | 2/2003 | Dunk | G05D 23/022 264/40.6 |
| 2005/0013358 A1* | 1/2005 | Song | H04N 5/21 375/240.2 |
| 2005/0036539 A1* | 2/2005 | Niederholz | H04L 25/0228 375/150 |
| 2007/0211827 A1 | 9/2007 | Baggen et al. | |
| 2008/0205555 A1* | 8/2008 | Zhu | H04B 1/712 375/340 |
| 2008/0225934 A1* | 9/2008 | Mourad | H04L 25/0212 375/227 |
| 2011/0228884 A1* | 9/2011 | Qiu | H04L 25/022 375/350 |
| 2013/0051445 A1 | 2/2013 | Liu et al. | |

(Continued)

*Primary Examiner* — Andrew Lee

(57) ABSTRACT

The present disclosure is related to a method and apparatus for channel estimation in a wireless communication system. The method and apparatus for channel estimation are used to determine a number of sub-carriers or symbols to be used to estimate N channels for N user equipment (UE)s on a basis of resource allocation information on N reference signals associated with the N UEs, estimate channel values for the N channels by receiving the N reference signals through the sub-carriers or the symbols according to the determined number, and correlate the estimated channel values to use the correlated channel values to estimate each of the N channels.

20 Claims, 4 Drawing Sheets

(56) References Cited

U.S. PATENT DOCUMENTS

| | | | |
|---|---|---|---|
| 2013/0121392 A1 | 5/2013 | Thompson et al. | |
| 2014/0056393 A1* | 2/2014 | Xu | H04L 25/0212 375/343 |
| 2014/0219403 A1* | 8/2014 | Su | H04L 25/0232 375/346 |
| 2014/0334530 A1* | 11/2014 | Thompson | H04L 25/0212 375/232 |
| 2015/0195107 A1* | 7/2015 | Bar-Or | H04L 25/0236 370/335 |

* cited by examiner

METHOD AND APPARATUS FOR CHANNEL ESTIMATION IN WIRELESS COMMUNICATION SYSTEM

CROSS-REFERENCE TO RELATED APPLICATION(S) AND CLAIM OF PRIORITY

The present application is related to and claims the priority under 35 U.S.C. §119(a) to Korean Application Serial No. 10-2014-0053305, which was filed in the Korean Intellectual Property Office on May 2, 2014, the entire content of which is hereby incorporated by reference.

TECHNICAL FIELD

The present disclosure relates to a method and apparatus for channel estimation in a wireless communication system.

BACKGROUND

Wireless communication systems, such as orthogonal frequency division multiplexing (OFDM) communication systems, are based on a physical layer structure in which frequency axis and time axis resources are allocated and used for data transmission. In such wireless communication systems, a transmitter two-dimensionally places reference signal (RS) symbols, such as pilot symbols, in resource elements (REs) within a resource block (RB) to increase channel estimation performance and then transmits the RS symbols. A receiver performs channel estimation on the basis of the RS symbols placed in the REs to enhance the accuracy for the channel estimation.

Meanwhile, a time-domain/frequency-domain filtering method, an interpolation method, a least square (LS) method, a minimum mean square error (MMSE) method, a 2-dimensional Wiener filtering method, and the like are widely used as a method for channel estimation. The above channel estimation methods may be selected and used on the basis of a wireless channel environment. That is because channel estimation performance varies with the channel estimation method that is used in the corresponding wireless channel environment. Accordingly, an appropriate channel estimation method may be selected and used according to whether the wireless channel environment is a frequency selective fading environment, a flat fading environment, or an environment in which user equipment (UE) moves at a high or low speed.

In general, when a two-dimensional statistical characteristic (Wide-sense stationary uncorrelated scattering: WSSUS) of a channel is known, the 2-dimensional Wiener filtering method is most effective for channel estimation and is widely used in the actual implementation. However, in cases where the 2-dimensional Wiener filtering method is used in multiple input multiple output (MIMO) communication systems, channel estimation performance is degraded due to interference. That is, in the MIMO communication systems, interference is not completely removed even though an interference removal operation is performed by distinguishing between signals of respective UEs, and therefore the channel estimation performance is affected by the unremoved interference. That is because the existing 2-dimensional Wiener filtering method of performing channel estimation by applying a Wiener filter to a single layer signal does not consider interference existing after signal separation for multiple layer signals.

SUMMARY

To address the above-discussed deficiencies, it is a primary object to provide, for use in a method and apparatus for channel estimation in a wireless communication system.

Various embodiments of the present disclosure provide a method and apparatus that prevents channel estimation performance from being degraded in a wireless communication system in which a MIMO communication scheme is used.

Various embodiments of the present disclosure provide a method and apparatus that enables accurate channel estimation to be performed in a receiver, thereby increasing a transmission data rate and enhancing cell throughput.

In accordance with various embodiments of the present disclosure, a method for channel estimation in a wireless communication system is provided. The method includes: determining a number of sub-carriers or symbols to be used to estimate N channels for N UEs on a basis of resource allocation information on N reference signals associated with the N UEs; estimating channel values for the N channels by receiving the N reference signals through the sub-carriers or the symbols according to the determined number; and correlating the estimated channel values and using the correlated channel values to estimate each of the N channels.

In accordance with various embodiments of the present disclosure, an apparatus for channel estimation in a wireless communication system is provided. The apparatus includes: a reception unit and a controller configured to determine a number of sub-carriers or symbols to be used to estimate N channels for N UEs on a basis of resource allocation information on N reference signals associated with the N UEs, estimate channel values for the N channels when the N reference signals are received through the sub-carriers or the symbols according to the determined number, and correlate the estimated channel values to use the correlated channel value to estimate each of the N channels.

The present disclosure prevents performance degradation for channel estimation that can occur when a MIMO communication scheme is used. In addition, the present disclosure allows channel estimation to be performed in consideration of interference that exists after a multiple user interference (MUI) removal operation is performed. Therefore, the present disclosure has the advantages of increasing a transmission data rate and enhancing cell throughput with increasing accuracy for channel estimation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
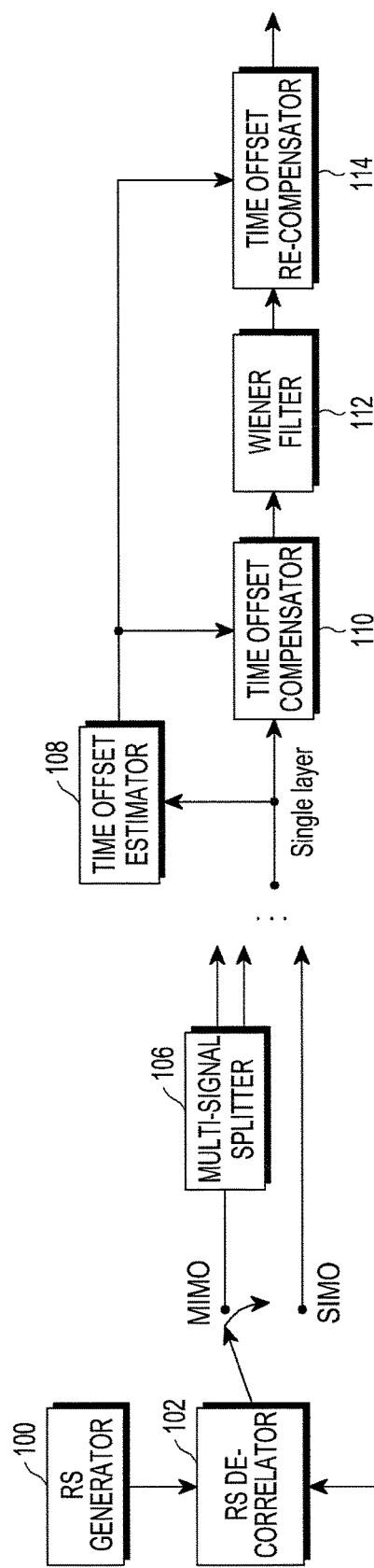
FIG. 1 illustrates an apparatus for channel estimation according to various embodiments of the present disclosure.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

Among the generally used channel estimation methods is a 2-dimensional Wiener filtering method as the best channel estimation method. A Wiener filter for frequency and time axis reference signal (RS) symbols used in the 2-dimensional Wiener filtering method is implemented, for example, as follows.

In a wireless communication system, such as an orthogonal frequency division multiplexing (OFDM) communication system, the output value of the k-th tone is calculated using the following Equation 1.

$$\hat{H}_k = H_k + n_k \quad \text{[Equation 1]}$$

In Equation 1 above, $\hat{H}_k$ denotes the output value of the k-th tone, $H_k$ denotes the channel value of the k-th tone, and $n_k$ denotes the noise component of the k-th tone.

In a long term evolution (LTE) uplink system, an RS is allocated to twelve consecutive tones per resource block (RB) for a physical uplink shared channel (PUSCH). Accordingly, the channel estimation value of the k-th tone is represented as shown in the following Equation 2.

$$\tilde{H}_k = \sum_{i=0}^{11} c_i \hat{H}_i = \sum_{i=0}^{11} c_i (H_i + n_i) = c^H \hat{H} \quad \text{[Equation 2]}$$

In Equation 2 above, $\hat{H}_k$ denotes the channel estimation value of the k-th tone, i denotes a tone index, $c_i$ denotes the Wiener filter coefficient of the i-th tone, $\hat{H}_i$ denotes the time offset compensation value of the i-th tone, $H_i$ denotes the channel value of the i-th tone, and $n_i$ denotes the noise component for the i-th frequency tone. However, the time offset compensation can be performed according to the presence or absence of a multipath delay component, or a time delay can occur in a receiver. In exemplary embodiments of the present disclosure, considering that a general mobile communication system is involved in an environment in which a time offset exists, a channel estimation scheme, including a structure for compensating for the time offset, will be described.

The Wiener filter coefficient c, as a value that minimizes the minimum mean square error (MMSE) (i.e., $E\{|H_k - \tilde{H}_k|^2\}$) between a desired channel value ($H_k$) and a Wiener filter output value (channel estimation value $\tilde{H}_k$), is represented by the following Equation 3.

$$c = (E\{\hat{H}\hat{H}^H\})^{-1} E\{\hat{H}H^*_k\} = (R_h + \sigma^2 I)^{-1} E\{\hat{H}H^*_k\} = (R_h + \sigma^2 I)^{-1} r \quad \text{[Equation 3]}$$

In Equation 3 above, $R_h$ denotes the auto-correlation matrix of a channel, r denotes the cross-correlation matrix of the channel, σ denotes noise power, and I denotes an identity matrix.

When the Wiener filter coefficient c is determined as described above, the channel estimation value of the k-th tone is represented as shown in the following Equation 4.

$$\tilde{H}_k = ((R_h + \sigma^2 I)^{-1} r)^H \cdot \hat{H} \quad \text{[Equation 4]}$$

The Wiener filter coefficient is determined from the channel correlation value in this way, and a two-dimensional correlation matrix for a single input multi output (SIMO) is determined as follows.

When a fading channel response to user equipment (UE) is represented by the following Equation 5, the fast Fourier transform (FFT) of the fading channel response into a channel value in a frequency domain results in the following Equation 6 at $(t_1, f_1)$ (the $f_1$-th sub-carrier of the $t_1$-th symbol).

$$h(t_1, \tau) = \sum_{l=1}^{L} h_l(t_1) \delta(\tau - \tau_l) \quad \text{[Equation 5]}$$

$$H(t_1, f_1) = \sum_{l=1}^{L} h_l(t_1) W^{\tau_l f_1} \quad \text{[Equation 6]}$$

In Equation 5 above, τ denotes the time variable for which the fading channel exists, $\tau_1$ denotes the delay profile of the l-th reception path, l denotes the index of multiple paths received from a particular UE, and L denotes the total number of paths. In Equation 6 above, $$W = e^{-\frac{j2\pi}{N_{FFT}}}, \text{ and } E[|h_l(t)|^2] = H_l, \Sigma_1^L H_l = 1.$$

Similarly to the above, the channel value at $(t_2, f_2)$ is represented as shown in the following Equation 7.

$$H(t_2, f_2) = \Sigma_{l=1}^{L} h_l(t_2) W^{\tau_l f_2} \quad \text{[Equation 7]}$$

Based on the channel values of $(t_1, f_1)$ and $(t_2, f_2)$ (preset resources to which an RS sequence is allocated), a two-dimensional correlation matrix is determined using Equation 8 below.

$$R_{hh} = E[H(t_1, f_1) H(t_2, f_2)^*] = \quad \text{[Equation 8]}$$

$$\sum_{l'}^{L} \sum_{l''}^{L} E[h'_l(t_1) h''_l(t_2)^*] W^{\tau_{l'} f_1 - \tau_{l''} f_2}$$

Since channels are independent between multiple paths (i.e., signals are received via different paths for respective UEs), a mean value exists only when the corresponding channels have the same path (l'=l"). In other words, $$E[h_{l'}(t_1)h_{l''}(t_2)^*] = \delta(l' - l'') \cdot J_0\left(2\pi f_c \frac{v}{c}(t_2 - t_1)T\right)$$

is obtained, and the two-dimensional correlation matrix determined from this equation is represented as shown in the following Equation 9.

$$R_{hh} = \underbrace{\sum_l^L H_l W^{\tau_l(f_1-f_2)}}_{freq\ domain} \cdot \underbrace{J_0\left(2\pi f_c \frac{v}{c}(t_2 - t_1)T\right)}_{time\ domain} \quad \text{[Equation 9]}$$

In this way, the channel correlation matrix is expressed in two dimensions of the frequency axis and the time axis, and the optimum channel estimation value is acquired by estimating the channel profile, namely, the delay profile difference (TO and the moving speed (v) of the multiple paths.

Hereinafter, a wireless communication system for performing channel estimation in such a manner as described above will be described with reference to FIG. 1.

FIG. 1 illustrates an apparatus for channel estimation according to various embodiments of the present disclosure.

Referring to FIG. 1, the apparatus for channel estimation includes at least one of an RS generator 100, an RS de-correlator 102, an FFT device 104, a multi-signal splitter 106, a time offset estimator 108, a time offset compensator 110, a Wiener filter 112, and a time offset re-compensator 114.

The RS generator 100 generates an RS sequence, and the FFT device 104 performs fast Fourier transform (FFT) on a reception signal to output the transformed signal to the RS de-correlator 102. The RS de-correlator 102 maps the RS sequence onto an RS symbol.

The RS de-correlator 102 determines an output direction according to whether a MIMO or SIMO communication scheme is used in a wireless communication system. Specifically, when the MIMO communication scheme is used, the RS de-correlator 102 determines the output direction such that the output of the RS de-correlator 102 is input to the multi-signal splitter 106 for splitting signals for respective UEs.

The multi-signal splitter 106, when RBs allocated to respective layers are the same, removes interference between a plurality of UEs that are distinguished by a cyclic shift (CS). The multi-signal splitter 106 distinguishably outputs signals for the multiple layers such that the signals for the multiple layers are subjected to processing (single layer processing).

The multi-signal splitter 106, when the RBs allocated to the respective layers are different from each other, removes interference between the plurality of UEs that are distinguished by orthogonal cover codes. The multi-signal splitter 106 distinguishably outputs the signals for the multiple layers such that the signals for the multiple layers are processed.

Meanwhile, the RS de-correlator 102, when the SIMO communication scheme is used, determines the output direction such that the output of the RS de-correlator 102 is directly output without being input to the multi-signal splitter 106 (i.e., while bypassing the multi-signal splitter 106).

The time offset estimator 108 estimates a time offset for the reception signal that has been fast Fourier transformed in the time or frequency domain. For example, the time offset estimator 108 estimates the time offset using a method of estimating the location of a sample having a peak value by performing inverse discrete Fourier transform on the fast Fourier transformed reception signal, or using a method of calculating an accumulated average value of phase differences between tones in the frequency domain.

The time offset compensator 110 compensates for phases according to sub-carriers for the fast Fourier transformed reception signal to output the phase-compensated reception signal to the Wiener filter 112. The Wiener filter 112 applies a Wiener filter coefficient obtained from a channel correlation value to the received channel value in order to detect the channel estimation value for the phase-compensated reception signal. The time offset re-compensator 114 recovers the phase of the phase-compensated signal as it is on the basis of the channel estimation value.

When the MIMO communication scheme is used in the apparatus for channel estimation as described above, the multi-signal splitter 106 is used to split signals of multiple layers. The signals split by the multi-signal splitter 106 are used for channel estimation of the corresponding layer through the same procedure as when the SIMO communication scheme is used.

The channel estimation method using the Wiener filer 112 provides the most excellent channel estimation performance in regard to each layer. However, such a channel estimation method may not be the optimum channel estimation method when the MIMO communication scheme is used. That is because the Wiener filter 112 is applied without consideration of the fact that interference still exists even through a multi user interference (MUI) removal operation is performed to split signals of UEs according to respective layers. Accordingly, in certain embodiments, the channel estimation performance for a MIMO user is degraded.

The MUI removal operation will be specifically described. In the embodiment of the present disclosure, a case of removing interference between a plurality of UEs, which are distinguished by a CS, when RBs allocated to respective layers are the same will be representatively described.

An RS used for channel estimation is represented as shown in the following Equation 10.

$$r_{u,v}^{(\alpha)}(n) = e^{j\alpha n} \overline{r}_{u,v}(n), 0 \leq n < M_{sc}^{RS} \quad \text{[Equation 10]}$$

In Equation 10 above, u denotes a group number used for group hopping, and u∈{0, 1, . . . , 29}. v denotes a base sequence number used for sequence hopping, and v∈{0,1} and v=0 for 5 RBs or fewer. α denotes a phase shift value for generating an RS sequence on the basis of a base sequence and is set to $$\alpha = \frac{2\pi n_{cs}}{12}.$$

$M_{sc}^{RS}$ denotes the number of sub-carriers depending on an allocated RB size and is set to $M_{sc}^{RS}=12N_{I_{RB}}(u)$. In certain embodiments, $N_{I_{RB}}(u)$ denotes the RB size corresponding to an RB index (IRB).

Meanwhile, the base sequence is generated using the following Equation 11.

$$r_{u,v}(n) = \begin{cases} e^{-j\frac{\pi qm(m+1)}{N_{ZC}^{RS}}}, & \text{if } M_{sc}^{RS} \geq 3N_{sc}^{RB} \\ e^{jd(n)\pi/4}, & \text{Otherwise} \end{cases} \quad \text{[Equation 11]}$$

In Equation 11 above, $\bar{r}_{u,v}(n)$ denotes the base sequence, and $m = \mod(n, N_{ZC}^{RS})$, $q = \lfloor \bar{q} + \frac{1}{2} \rfloor + v \cdot (-1)^{\lfloor 2\bar{q} \rfloor}$, and $\bar{q} = N_{ZC}^{RS} \cdot (u+1)/31$. $N_{ZC}^{RS}$ denotes the length of a Zadoff-Chu (ZC) sequence and has a value related to the RB index $(I_{RB})$ as listed in the following Table 1.

TABLE 1

| RB Index $I_{RB}$ | $N_{ZC}^{RS}$ |
|---|---|
| 0 | 11 |
| 1 | 23 |
| 2 | 31 |
| 3 | 47 |
| 4 | 59 |
| 5 | 71 |
| 6 | 89 |
| 7 | 107 |
| 8 | 113 |
| 9 | 139 |
| 10 | 179 |
| 11 | 191 |
| 12 | 211 |
| 13 | 239 |
| 14 | 283 |
| 15 | 293 |
| 16 | 317 |
| 17 | 359 |
| 18 | 383 |
| 19 | 431 |
| 20 | 479 |
| 21 | 523 |
| 22 | 571 |
| 23 | 599 |
| 24 | 647 |
| 25 | 719 |
| 26 | 761 |
| 27 | 863 |
| 28 | 887 |
| 29 | 953 |
| 30 | 971 |
| 31 | 1069 |
| 32 | 1151 |
| 33 | 1193 |
| 34 | 1291 |
| 35 | 1536 |

When u, v, and $n_{cs}$ (the number of cyclic shifts (CSs)) allocated to each UE are input from a higher layer, when the number of UEs is two, the RS generator 100 generates an RS sequence for the first UE that is one of the two UEs. The RS sequence is mapped with an RS symbol in the RS de-correlator 102 and has a channel impulse response (CIR) from sample 0 after IDFT when it is assumed that there is no uplink time offset of all the UEs. In addition, the second UE, which is the other of the two UEs, has a CIR from sample $\mod(12 + n_{cs}^{(1)} - n_{cs}^{(0)}, 12) N_{I_{RB}(u)}$. In the above equation, $n_{cs}^{(1)}$ denotes the number of CSs of the second UE, and $n_{cs}^{(0)}$ denotes the number of CSs of the first UE. For reference, twelve CSs from 0 to 11 are assigned to distinguish the UEs in the same ZC sequence, and in this case, one of the twelve CSs is designated to each UE.

The RS sequence generated for the first UE is multiplied by a sub-carrier corresponding to an RS symbol among symbols of a frequency signal output after FFT and is generated as a de-correlated RS sub-carrier as follows.

$$\tilde{r}_k^{r,RS} = r_k^{r,RS} r_{u,v}^{(\alpha)}(k), 0 \leq k < M_{sc}^{RS} \quad \text{[Equation 12]}$$

In Equation 12, $\tilde{r}_k^{r,RS}$ denotes the de-correlated RS sub-carrier, $r_k^{r,RS}$ denotes the sub-carrier including the RS symbol among the symbols of the frequency signal output after FFT, and $r_{u,v}^{(\alpha)}(k)$ denotes the RS sequence generated for the first UE.

Meanwhile, a method of distinguishing between the signal of the first UE and the signal of the second UE will be described as follows. When the RS of the first UE is $r_{u,v}^{(\alpha)}(n) = e^{j\alpha_1 n} \bar{r}_{u,v}(n)$ $0 \leq n < M_{sc}^{RS}$ and the RS of the second UE is $r_{u,v}^{(\alpha)}(n) = e^{j\alpha_2 n} \bar{r}_{u,v}(n)$ $0 \leq n < M_{sc}^{RS}$, a reception signal is represented as shown in the following Equation 13.

$$r_k^{r,RS} = H_1 e^{j\alpha_1 n} \bar{r}_{u,v}(n) + H_2 e^{j\alpha_2 n}$$
$$\bar{r}_{u,v}(n) = (H_1 e^{j\alpha_1 n} + H_2 e^{j\alpha_2 n}) \bar{r}_{u,v}(n) \quad \text{[Equation 13]}$$

The de-correlation result for the RS of the first UE for distinguishing the signal of the first UE from the reception signal is represented as shown in the following Equation 14.

$$\tilde{r}_k^{r,RS} = r_k^{r,RS} e^{-j\alpha_1 n} \bar{r}_{u,v}(n) = (H_1 + H_2 e^{j(\alpha_2 - \alpha_1)n}) \quad \text{[Equation 14]}$$

The following Equation 15 has to be satisfied to remove an interference component from H1 and H2, which are channels of the first and second UEs, in view of an interval that does not vary with a frequency at every channel estimation interval.

$$e^{j(\alpha_2 - \alpha_1)n} = e^{j((2\pi n_{cs,2} - 2\pi n_{cs,1})/12)n} = e^{j2\pi(n_{cs,2} - n_{cs,1}/12)n} = e^{j2\pi}$$
$$(\Delta n^{cs/12})n = >0 \quad \text{[Equation 15]}$$

When as many $e^{j2\pi(\Delta n_{cs}/12)n}$ of Equation 15 as NT (an arbitrary integer * a period) tones are added, the interference channel component is removed as shown in the following Equation 16, thereby acquiring the channel of the first UE.

$$\frac{1}{NT} \sum_{n=0}^{NT-1} \tilde{r}_k^{r,RS} = H_1 + \frac{H_2}{NT} \sum_{n=0}^{NT-1} e^{j2\pi(\Delta n_{cs}/12)n} \approx H_1 \quad \text{[Equation 16]}$$

In Equation 16 above, $H_1$ denotes the channel of the first UE, $H_2$ denotes the channel of the second UE, and T denotes the period. When $\Delta_{cs}^{(t)}$, the CS difference between the first and second UEs, is not 1, 5, or 7, a setting is made to $12/\Delta_{cs}^{(t)}$ (when $\Delta_{cs}^{(t)}$ is smaller than or equal to 6) or $12/(12 - \Delta_{cs}^{(t)})$ (when $\Delta_{cs}^{(t)}$ is larger than 6), and when $\Delta_{cs}^{(t)}$ is 1, 5, or 7, a setting is made to 12.

The channel of the first UE is completely acquired in an ideal channel, such as additive white Gaussian noise (AWGN), without time offset and noise. However, in the distinction of the channels of the UEs, more residual interference components are left with increasing selective characteristics and noise, and with increasing tones added (when $\Delta_{cs}^{(t)}$ is 1, 5, or 7).

Accordingly, only the channel of the first UE having no interference with the other multiplexed UE cannot be purely deduced, and therefore the best channel estimation performance cannot be ensured even though the optimum Wiener filtering is performed.

Figure 2:
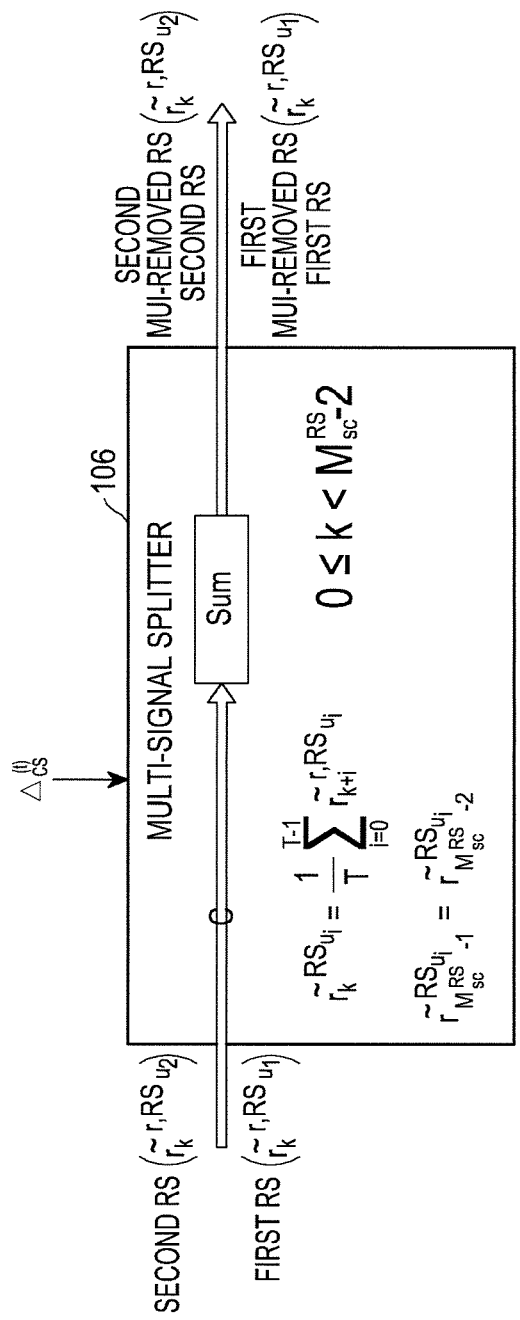
FIG. 2 illustrates a detailed configuration of a multi-signal splitter for performing an MUI removal operation according to various embodiments of the present disclosure.

FIG. 2 illustrates a detailed configuration of a multi-signal splitter for performing an MUI removal operation according to various embodiments of the present disclosure.

Referring to FIG. 2, a multi-signal splitter 106 determines a period T when $\Delta_{cs}^{(t)}$, the CS difference between UEs, is input from a higher layer (such as DSP software, etc.). When a de-correlated signal $\tilde{r}_k^{RS_{u1}}$ for the RS of the first UE is input, the multi-signal splitter 106 adds T frequency signals from the k-th frequency signal to (k+T−1)-th frequency signal to calculate the mean thereof and outputs the calculated mean value as the k-th MUI-removed signal $\tilde{r}_k^{RS_{u1}}$. In addition, when a de-correlated signal $r_k^{RS_{u2}}$ for the RS of the second UE is input, the multi-signal splitter 106 adds T frequency signals from the k-th frequency signal to (k+T−1)-th frequency signal to calculate the mean thereof and outputs the calculated mean value as the k-th MUI-removed signal $\tilde{r}_k^{RS_{u2}}$.

As described above, when the method of outputting the MUI-removed signal in the form of calculating the mean value is used, a residual interference component on the channel of each UE may not be completely removed, and therefore the optimum channel estimation performance cannot be expected.

Accordingly, various embodiments of the present disclosure provide a method and apparatus for preventing performance degradation for channel estimation when a MIMO communication scheme is used. Specifically, the embodiment of the present disclosure provides a method and apparatus for acquiring the optimum Wiener filter coefficient using a residual interference component left after an MUI removal operation.

Hereinafter, an apparatus for channel estimation, according to various embodiments of the present disclosure, will be described with reference to FIG. 3.

Figure 3:
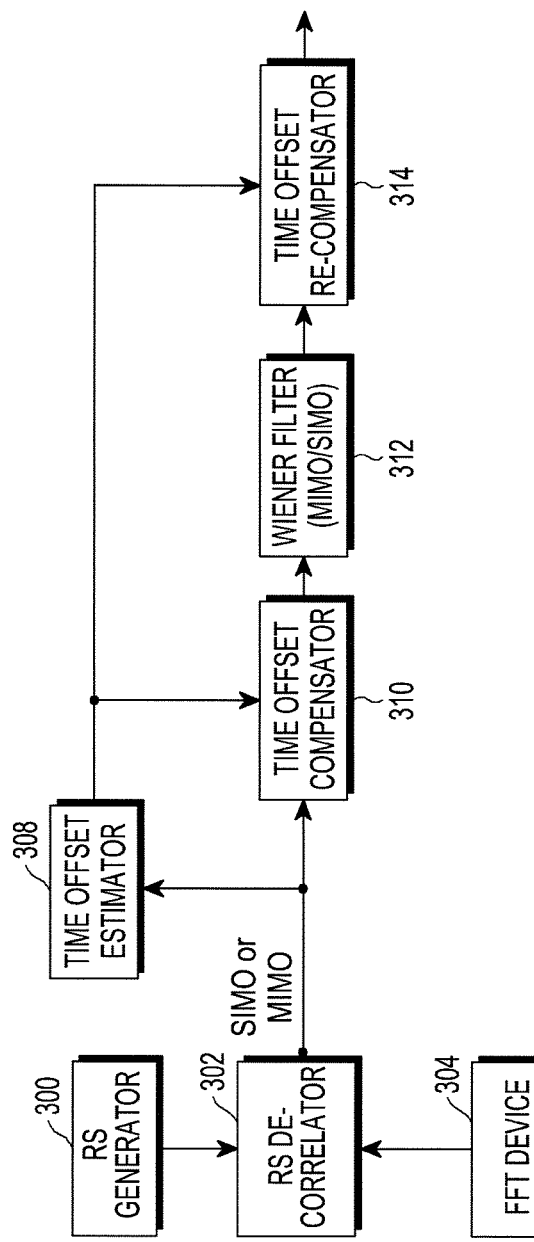
FIG. 3 illustrates an apparatus for channel estimation according to various embodiments of the present disclosure.

FIG. 3 illustrates the apparatus for channel estimation according to various embodiments of the present disclosure. The apparatus for channel estimation illustrated in FIG. 3 can be included, for example, in an uplink system of an LTE communication system.

Referring to FIG. 3, the apparatus for channel estimation includes at least one of an RS generator 300, an RS de-correlator 302, an FFT device 304, a time offset estimator 308, a time offset compensator 310, a Wiener filter 312, and a time offset re-compensator 314.

In addition, in the apparatus for channel estimation, one controller implements the functions of the RS generator 300, the RS de-correlator 302, the FFT device 304, the time offset estimator 308, the time offset compensator 310, the Wiener filter 312, and the time offset re-compensator 314.

Furthermore, the apparatus for channel estimation includes a reception unit for receiving a signal.

Specifically, the RS generator 300 generates an RS sequence, and the FFT device 304 performs fast Fourier transform (FFT) on a signal to be transmitted to output the transformed signal to the RS de-correlator 302. The RS de-correlator 302 outputs the RS sequence mapped with an RS symbol.

The time offset estimator 308 estimates a time offset for the received signal that has been fast Fourier transformed in the time or frequency domain. For example, the time offset estimator 308 estimates the time offset using a method of estimating the location of a sample having a peak value after IDFT, or using a method of calculating an accumulated average value of phase differences between tones in the frequency domain.

The time offset compensator 310 compensates for phases according to sub-carriers for the fast Fourier transformed reception signal to output the phase-compensated reception signal to the Wiener filter 312. The Wiener filter 312 applies a Wiener filter coefficient obtained from a channel correlation value to the received channel value in order to detect the channel estimation value for the phase-compensated reception signal. The time offset re-compensator 314 recovers the phase of the phase-compensated signal as it is on the basis of the channel estimation value.

The Wiener filter 312 is used when a SIMO communication scheme or a MIMO communication scheme is used. In addition, although the time offset estimator 308 and the time offset compensator 310 are illustrated to be physically separated elements in FIG. 3, the operations of the time offset estimator 308 and the time offset compensator 310 are integrally performed by the Wiener filter 312, and in certain embodiments, the time offset estimator 308 and the time offset compensator 310 may not be included in the apparatus for channel estimation.

Meanwhile, in a general wireless communication system, two-dimensional Wiener filtering is used to determine a Wiener filter coefficient on the basis of a correlation matrix for the SIMO communication scheme. Therefore, when the MIMO communication scheme is used in the general wireless communication system, channel estimation is performed without consideration for MUI, and thus the performance of the channel estimation is degraded.

Accordingly, various embodiments of the present disclosure proposes a method for Wiener filtering that is effectively used in the MIMO communication scheme as well as the SIMO communication scheme. The method for Wiener filtering proposed by the embodiment of the present disclosure considers MUI to prevent the channel estimation performance from being degraded.

When two UEs, a first UE and a second UE, are allocated through a collaborative spatial multiplexing method, that is, when a multiple user (MU)-MIMO communication scheme is used, a two-dimensional correlation matrix is calculated.

The fading channel of the first UE is represented, for example, as shown in the following Equation 17.

$$h_1(t_1, \tau) = \sum_{l=1}^{L_1} h_{1l}(t_1)\delta(\tau - \tau_{1l}) \qquad \text{[Equation 17]}$$

In Equation 17 above, $h_1(t_1,\tau)$ denotes the fading channel of the first UE, and δ denotes an impulse function.

The fading channel of the second UE is represented, for example, as shown in the following Equation 18.

$$h_2(t_1, \tau) = \sum_{l=1}^{L_2} h_{2l}(t_1)\delta(\tau - \tau_{2l}) \qquad \text{[Equation 18]}$$

In Equation 18 above, $h_2(t_1, \tau)$ denotes the fading channel of the second UE.

When the MU-MIMO communication scheme is used, the channels of the first and second UEs are received at one time, and therefore the actual reception channel is represented by $H_1(t_1,\tau)=h_1(t_1,\tau)+h_2(t_1,\tau)$. The actual reception channel is represented as shown in the following Equation 19 at $(t_1, f_1)$ in the frequency domain.

$$H_1(t_1, f_1) = \sum_{l=1}^{L_1} h_{1l}(t_1)W^{\tau_{1l}f_1} + \sum_{l=1}^{L_2} h_{2l}(t_1)W^{\tau_{2l}f_1} \qquad \text{[Equation 19]}$$

In Equation 19 above, $$W = e^{-\frac{j2\pi}{N_{FFT}}},$$

and $E[|h_l(t)|^2]=H_l$, $\Sigma_1^L H_l = 1$.

Meanwhile, the signals of the first and second UEs are distinguished from each other through a method of performing the summation of sub-carriers in the frequency domain. This is represented as shown in the foregoing Equation 16, and the signals of the first and second UEs are distinguished from each other by de-correlating the signals as RS sequences of the corresponding UEs, and summing the sub-carriers for a multiple of a period T in order to obtain channel values by distinguishing the signals of the first and second UEs as in the above-described MUI removal method.

When ZC sequences that are the same but have different CSs are used for the UEs subjected to multiplexing, the RS signals of the two UEs appear in such a form that a difference between sub-carriers is phase-rotated by the interval between the CSs. Equation 14 represents this, and when the sub-carriers are summed for a multiple of a period T, the signal component having a difference of the CS interval from the signal of the corresponding UE disappears and only the signal ($H_1$) of the corresponding UE is left as represented by Equation 16. Considering this, the number of sub-carriers to be summed is determined depending on the allocated CS interval.

When the number of sub-carriers is determined as described above, the reception channel response values of the sub-carriers are added up. For example, in cases where the CS interval is 6 and two sub-carriers are summed, the total sum of the channel values for the two sub-carriers is as follows.

The channel ($H_1(t_1, f_1+1)$) in a sub-carrier subsequent to $f_1$ is represented as shown in the following Equation 20, and the total sum of the channel values for the two sub-carriers is represented as shown in Equation 21.

$$H_1(t_1, f_1+1) = \sum_{l=1}^{L_1} h_{1l}(t_1) W^{\tau_{1l}(f_1+1)} - \sum_{l=1}^{L_2} h_{2l}(t_1) W^{\tau_{2l}(f_1+1)} \quad \text{[Equation 20]}$$

$$H(t_1, f_1) + H(t_1, f_1+1) = \quad \text{[Equation 21]}$$
$$\sum_{l=1}^{L_1} h_{1l}(t_1) W^{\tau_{1l} f_1} (1 + W^{\tau_{1l}}) + \sum_{l=1}^{L_2} h_{2l}(t_1) W^{\tau_{2l} f_1} (1 - W^{\tau_{2l}})$$

Similarly, the channel value at ($t_2$, $f_2$) is represented as shown in the following Equation 22.

$$H(t_2, f_2) + H(t_2, f_2+1) = \quad \text{[Equation 22]}$$
$$\sum_{l=1}^{L_1} h_{1l}(t_2) W^{\tau_{1l} f_2} (1 + W^{\tau_{1l}}) + \sum_{l=1}^{L_2} h_{2l}(t_2) W^{\tau_{2l} f_2} (1 - W^{\tau_{2l}})$$

A two-dimensional correlation matrix is determined using the following Equation 23 on the basis of the channel values of ($t_1$, $f_1$) and ($t_2$, $f_2$) that have been calculated as described above.

$$R_{hh} = \frac{1}{4} E[(H(t_1, f_1) + H(t_1, f_1+1)) \quad \text{[Equation 23]}$$
$$(H(t_2, f_2) + H(t_2, f_2+1))^*] =$$
$$\frac{1}{4} \sum_{l'}^{L_1} \sum_{l''}^{L_1} E[h_{1l'}(t_1) h_{1l''}(t_2)^*] W^{\tau_{1l'} f_1 - \tau_{1l''} f_2} (1 + W^{\tau_{1l'}})$$

$$(1 + W^{-\tau_{1l''}}) + \frac{1}{4} \sum_{l'}^{L_2} \sum_{l''}^{L_2} E[h_{2l'}(t_1) h_{2l''}(t_2)^*]$$
$$W^{\tau_{2l'} f_1 - \tau_{2l''} f_2} (1 + W^{\tau_{2l'}})(1 + W^{-\tau_{2l''}}) +$$
$$\frac{1}{4} \sum_{l'}^{L_1} \sum_{l''}^{L_2} E[h_{1l'}(t_1) h_{2l''}(t_2)^*] W^{\tau_{1l'} f_1 - \tau_{2l''} f_2} (1 + W^{\tau_{1l'}})$$
$$(1 + W^{-\tau_{2l''}}) + \frac{1}{4} \sum_{l'}^{L_2} \sum_{l''}^{L_1} E[h_{2l'}(t_1) h_{1l''}(t_2)^*]$$
$$W^{\tau_{2l'} f_1 - \tau_{1l''} f_2} (1 + W^{\tau_{2l'}})(1 + W^{-\tau_{1l''}})$$

The channels allocated to multiple paths are different from each other, and the channels allocated to the respective UEs are also different from each other. Therefore, a mean value is calculated when l'=l" in the channel of a particular UE. Arrangement of the first added term $$\frac{1}{4} \sum_{l'}^{L_1} \sum_{l''}^{L_1} E[h_{1l'}(t_1) h_{1l''}(t_2)^*] W^{\tau_{1l'} f_1 - \tau_{1l''} f_2} (1 + W^{\tau_{1l'}})(1 + W^{-\tau_{1l''}})$$

in Equation 23 yields the following Equation 24.

$$\frac{1}{4} \sum_{l'}^{L_1} H_{1l'} W^{\tau_{1l'}(f_1-f_2)} (1 + 1 + W^{\tau_{1l'}} + W^{-\tau_{1l'}}) \cdot \quad \text{[Equation 24]}$$
$$J_0\left(2\pi f_c \frac{v}{c}(t_2-t_1)T\right) =$$
$$\underbrace{\sum_{l'}^{L_1} \left(1 + \cos\left(\frac{2\pi}{N_{FFT}} \tau_{1l'}\right)\right) / 2 \cdot H_{1l'} W^{\tau_{1l'}(f_1-f_2)}}_{\text{freq domain}} \cdot$$
$$\underbrace{J_0\left(2\pi f_c \frac{v}{c}(t_2-t_1)T\right)}_{\text{time domain}}$$

The second added term in Equation 23 also is arranged similar to Equation 24. For the third and fourth added terms in Equation 23, the channels are different from each other (i.e., $h_1 \neq h_2$) so that the mean value becomes 0. Therefore, a correlation matrix is determined as shown in the following Equation 25.

$$R_{hh} = \sum_{l}^{L_1} \left(1 + \cos\left(\frac{2\pi}{N_{FFT}} \tau_{1l}\right)\right) / 2 \cdot H_{1l} \quad \text{[Equation 25]}$$
$$W^{\tau_{1l}(f_1-f_2)} \cdot J_0\left(2\pi f_c \frac{v}{c}(t_2-t_1)T\right) +$$
$$\sum_{l}^{L_2} \left(1 - \cos\left(\frac{2\pi}{N_{FFT}} \tau_{2l}\right)\right) / 2 \cdot H_{2l}$$
$$W^{\tau_{2l}(f_1-f_2)} \cdot J_0\left(2\pi f_c \frac{v}{c}(t_2-t_1)T\right) =$$
$$\left[\underbrace{\sum_{l}^{L_1} \left(1 + \cos\left(\frac{2\pi}{N_{FFT}} \tau_{1l}\right)\right) / 2 \cdot H_{1l} W^{\tau_{1l}(f_1-f_2)}}_{\text{desired UE's channel}} +\right.$$

$$\frac{\sum_{l}^{L_2}\left(1-\cos\left(\frac{2\pi}{N_{FFT}}\tau_{2l}\right)\right)\Big/2 \cdot H_{2l}W^{\tau_{2l}(f_1-f_2)}}{\text{MUI chemist}}\Bigg]$$

$$J_0\left(2\pi f_c \frac{v}{c}(t_2-t_1)T\right)$$

Referring to Equation 25, the correlation matrix is determined in consideration of residual interference occurring after the MUI removal operation. When the determined correlation matrix is applied to the above-described Equation 4 as a Wiener filter coefficient used in the Wiener filter 312, the optimum channel estimation for a MIMO signal is performed.

Meanwhile, although the case in which the CS interval is 6 has been described above, the method according to the embodiment of the present disclosure can also be applied to other cases in which the CS interval is not 6. In addition, the Wiener filtering can also be used in UEs of a MIMO communication system, such as OCC, having mutually orthogonal RS symbols in a similar manner.

Figure 4:
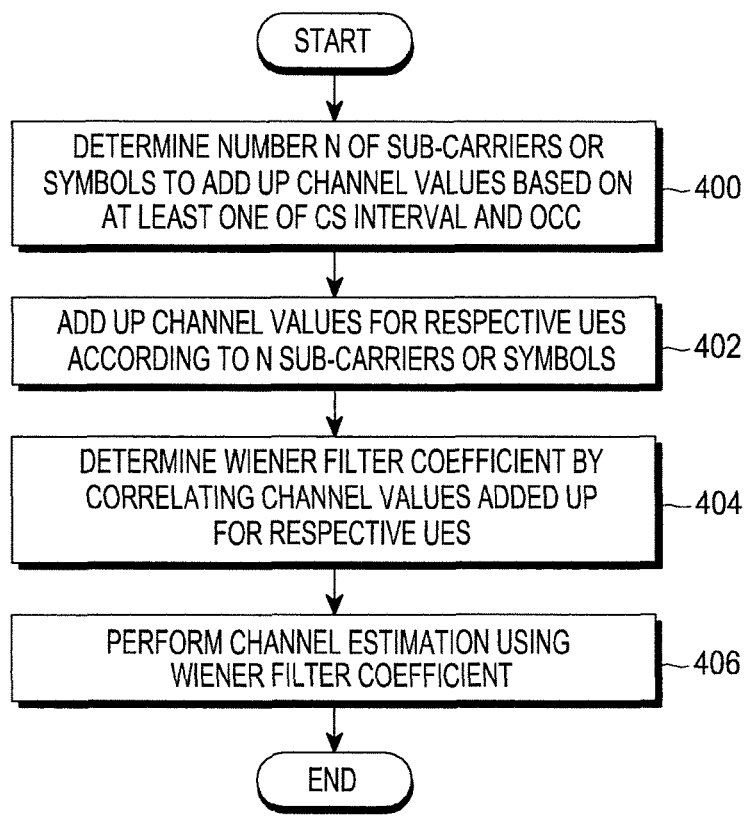
FIG. 4 illustrates a process of performing channel estimation according to various embodiments of the present disclosure.

FIG. 4 illustrates a process of performing channel estimation according to various embodiments of the present disclosure.

Referring to FIG. 4, in step 400, an apparatus for channel estimation determines the number N of sub-carriers or symbols to add up channel values on the basis of at least one of a CS interval and OCC. For example, when the CS interval is 6, N is 2, or when the OCC is applied, N is 2.

In step 402, the apparatus for channel estimation adds up the channel values for respective UEs according to the N sub-carriers or symbols. For example, in the case of 2 UE MIMO, the apparatus adds up the channel value of a first UE (hereinafter, referred to as a 'first channel value') and the channel value of a second UE (hereinafter, referred to as a 'second channel value') for the N sub-carriers or symbols.

The apparatus for channel estimation determines a Wiener filter coefficient by correlating the channel values added up for the respective UEs (by correlating the first and second channel values in the above example) in step 404, and performs channel estimation using the Wiener filter coefficient in step 406.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for channel estimation in a wireless communication system, the method comprising:
    determining a number of sub-carriers or symbols to be used to estimate N channels for N user equipment (UE) on a basis of resource allocation information on N reference signals associated with the N UEs;
    estimating channel values for the N channels by receiving the N reference signals through the determined number of the sub-carriers or the symbols; and
    correlating the estimated channel values and using the correlated channel values to estimate each of the N channels.

2. The method of claim 1, wherein the N reference signals comprise reference signals generated by cyclic-shifting (CS) one reference signal sequence.

3. The method of claim 2, wherein the resource allocation information comprises information on an interval between sub-carriers for which the CS is performed.

4. The method of claim 3, wherein determining the number of sub-carriers or symbols comprises:
    determining the number of sub-carriers on a basis of the information on the interval between the sub-carriers for which the CS is performed.

5. The method of claim 1, wherein the N reference signals comprise reference signals generated by applying orthogonal codes that are orthogonal to one reference signal sequence.

6. The method of claim 5, wherein the resource allocation information comprises information on the orthogonal codes.

7. The method of claim 6, wherein the determining of the number of sub-carriers or symbols comprises:
    determining the number of symbols on a basis of the information on the orthogonal codes.

8. The method of claim 1, wherein a result obtained by correlating the estimated channel values is used as a filter coefficient for removing interference between the N UEs.

9. The method of claim 8, wherein each of the N channels is estimated using the N reference signals and the filter coefficient.

10. The method of claim 1, wherein the N reference signals are simultaneously received through a same resource.

11. An apparatus for channel estimation in a wireless communication system, the apparatus comprising:
    a reception unit; and
    a controller configured to:
        determine a number of sub-carriers or symbols to be used to estimate N channels for N user equipment (UE)s on a basis of resource allocation information on N reference signals associated with the N UEs;
        estimate channel values for the N channels when the N reference signals are received through the determined number of the sub-carriers or the symbols; and
        correlate the estimated channel values and using the correlated channel values to estimate each of the N channels.

12. The apparatus of claim 11, wherein the N reference signals comprise reference signals generated by cyclic-shifting (CS) one reference signal sequence.

13. The apparatus of claim 12, wherein the resource allocation information comprises information on an interval between sub-carriers for which the CS is performed.

14. The apparatus of claim 13, wherein the controller is further configured to determine the number of sub-carriers on a basis of the information on the interval between the sub-carriers for which the CS is performed.

15. The apparatus of claim 11, wherein the N reference signals comprise reference signals generated by applying orthogonal codes that are orthogonal to one reference signal sequence.

16. The apparatus of claim 15, wherein the resource allocation information comprises information on the orthogonal codes.

17. The apparatus of claim 16, wherein the controller is further configured to determine the number of symbols on a basis of the information on the orthogonal codes.

18. The apparatus of claim 11, wherein a result obtained by correlating the estimated channel values is used as a filter coefficient for removing interference between the N UEs.

19. The apparatus of claim 18, wherein the controller is further configured to estimate each of the N channels using the N reference signals and the filter coefficient.

20. The apparatus of claim 11, wherein the N reference signals are simultaneously received through a same resource.

* * * * *